(12) United States Patent
Küpker et al.

(10) Patent No.: US 11,255,312 B2
(45) Date of Patent: Feb. 22, 2022

(54) FLANGE FRAME AND ASSEMBLY SET FOR PRE-ASSEMBLING AND/OR TRANSPORTING AND/OR ASSEMBLING A TOWER SEGMENT FOR A WIND TURBINE, AND METHODS

(71) Applicant: Wobben Properties GmbH, Aurich (DE)

(72) Inventors: Stephan Küpker, Rhauderfehn (DE); Günter Flessner, Ihlow (DE); Julia Sachs, Bremen (DE); Sascha Beeckmann, Veenhusen (DE); Wolfgang Meyer, Wiesmoor (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/763,517

(22) PCT Filed: Nov. 6, 2018

(86) PCT No.: PCT/EP2018/080268
§ 371 (c)(1),
(2) Date: May 12, 2020

(87) PCT Pub. No.: WO2019/096624
PCT Pub. Date: May 23, 2019

(65) Prior Publication Data
US 2020/0340453 A1   Oct. 29, 2020

(30) Foreign Application Priority Data
Nov. 16, 2017 (DE) .................... 10 2017 127 035.3

(51) Int. Cl.
*F03D 13/10* (2016.01)
*F03D 13/40* (2016.01)
*F03D 13/20* (2016.01)

(52) U.S. Cl.
CPC ............. *F03D 13/20* (2016.05); *F03D 13/10* (2016.05); *F03D 13/40* (2016.05); *F05B 2230/61* (2013.01); *F05B 2240/912* (2013.01)

(58) Field of Classification Search
CPC ....... F03D 13/40; F03D 13/10; F05B 2230/61
See application file for complete search history.

(56) References Cited

U.S. PATENT DOCUMENTS 8,960,747 B2 * 2/2015 Steffensen .............. B66C 1/108
294/67.5
8,998,546 B2 * 4/2015 Fenger .................... F03D 13/40
410/44

(Continued)

FOREIGN PATENT DOCUMENTS

| CN | 101597011 A | 12/2009 |
| CN | 201953581 U | 8/2011 |

(Continued)

*Primary Examiner* — Andrew J Triggs
(74) *Attorney, Agent, or Firm* — Seed Intellectual Property Law Group LLP

(57) ABSTRACT

A flange frame and to an assembly set for preassembling and/or for transporting and/or for assembling a tower segment for a wind turbine and/or a tower section of a wind turbine and/or a tower of a wind turbine, and also to methods. The flange frame comprises two flange sections for fastening the flange frame in a releasable manner on a horizontal flange of a tower segment, also comprises a lifting bolt for the engagement of a sling-like lifting unit, and further comprises a supporting element for supporting the flange frame on a standing surface.

22 Claims, 17 Drawing Sheets

(56) References Cited

U.S. PATENT DOCUMENTS

| | | | |
|---|---|---|---|
| 9,144,863 B2* | 9/2015 | Pedersen | B25B 11/00 |
| 9,200,468 B2 | 12/2015 | Brenner et al. | |
| 9,260,875 B2* | 2/2016 | Bjoernskov | B66C 1/108 |
| 9,316,208 B2* | 4/2016 | Friis | B66C 1/108 |
| 9,533,428 B2 | 1/2017 | Kapitza et al. | |
| 9,925,626 B2 | 3/2018 | Voigt et al. | |
| 10,208,498 B2* | 2/2019 | Pedersen | E04H 12/342 |
| 10,323,623 B2* | 6/2019 | Klein | B66C 1/108 |
| 10,830,212 B2* | 11/2020 | Meyer | F03D 80/00 |
| 2013/0104376 A1* | 5/2013 | Pedersen | B25B 11/00 29/525.02 |
| 2015/0003954 A1 | 1/2015 | Koerner et al. | |
| 2015/0308134 A1* | 10/2015 | Bjoernskov | F03D 80/00 52/741.3 |
| 2016/0312431 A1 | 10/2016 | Coordes | |
| 2018/0178708 A1* | 6/2018 | Stuart | B60P 7/12 |
| 2019/0003459 A1* | 1/2019 | Meyer | B66C 1/108 |
| 2019/0071862 A1 | 3/2019 | White | |
| 2019/0119907 A1 | 4/2019 | Kersten | |
| 2019/0161991 A1 | 5/2019 | Mtauweg et al. | |
| 2019/0170122 A1 | 6/2019 | Longeru et al. | |
| 2019/0271298 A1* | 9/2019 | Eriksen | B66C 1/108 |
| 2020/0340453 A1* | 10/2020 | Kupker | F03D 13/10 |

FOREIGN PATENT DOCUMENTS

| | | |
|---|---|---|
| DE | 102011077428 A1 | 12/2012 |
| DE | 102011078016 A1 | 12/2012 |
| DE | 102011080497 A1 | 2/2013 |
| DE | 112010005504 T5 | 3/2013 |
| DE | 102013226536 A1 | 6/2015 |
| DE | 102015209686 A1 | 12/2016 |
| DE | 102015211269 A1 | 12/2016 |
| DE | 102016106525 A1 | 10/2017 |
| DE | 102016106526 A1 | 10/2017 |
| DE | 102016114114 A1 | 2/2018 |
| DE | 102016114661 A1 | 2/2018 |
| EP | 2626547 A1 | 8/2013 |
| EP | 3 336 283 A1 | 6/2018 |
| ES | 2609308 B1 | 1/2018 |
| WO | 2010/012280 A1 | 2/2010 |
| WO | 2013/117182 A1 | 8/2013 |
| WO | 2015/148350 A2 | 10/2015 |

* cited by examiner

FLANGE FRAME AND ASSEMBLY SET FOR PRE-ASSEMBLING AND/OR TRANSPORTING AND/OR ASSEMBLING A TOWER SEGMENT FOR A WIND TURBINE, AND METHODS

TECHNICAL FIELD

The invention relates to a flange frame for preassembling and/or for transporting and/or for assembling a tower segment for a wind turbine and/or a tower section of a wind turbine and/or a tower of a wind turbine. The invention further relates to an assembly set for preassembling and/or for transporting and/or for assembling a tower segment for a wind turbine and/or a tower section of a wind turbine. The invention also relates to a method for preassembling and/or for transporting and/or for assembling a tower segment for a wind turbine and/or a tower section of a wind turbine and/or a tower of a wind turbine and also to a method for transporting a tower segment for a wind turbine and/or a tower section of a wind turbine and/or a tower of a wind turbine and to a method for preassembling and/or for assembling a tower segment for a wind turbine and/or a tower section of a wind turbine and/or a tower of a wind turbine. The invention also relates to a tower segment for a tower of a wind turbine, to a tower section for a tower of a wind turbine, to a tower of a wind turbine and to a wind turbine.

BACKGROUND

Description of the Related Art

Tower structures, in particular for wind turbines, often comprise a multiplicity of tower segments. For example, it is possible for a plurality of tower segments to be connected to one another via essentially vertical connections, as seen in the installed state, to form a—usually annular—tower section. A plurality of tower sections are arranged one above the other and form the tower.

Towers for wind turbines and tower segments and also production and assembly methods are known, for example, from DE 10 2011 077 428, DE 10 2011 078 016, WO 2015/148350, DE 10 2011 080 497, DE 10 2013 226 536, DE 10 2015 209 686, DE 10 2015 211 269, DE 10 2016 106 525, DE 10 2016 106 526, DE 10 2016 114 114 and DE 10 2016 114 661. Further improvements are desirable.

In the priority application relating to the present application, the German Patent and Trade Mark Office has searched the following prior art: U.S. Pat. No. 9,260,875 B2 and WO 2013/117 182 A1.

BRIEF SUMMARY

Provided is a flange frame and an assembly set for preassembling and/or for transporting and/or for assembling a tower segment for a wind turbine, and also corresponding methods, which are improved in relation to existing solutions. In particular, provided is a flange frame and an assembly set for preassembling and/or for transporting and/or for assembling a tower segment for a wind turbine, and also corresponding methods, which simplify and/or improve the preassembly and/or the transportation and/or the assembly of tower segments.

Provided is a flange frame for preassembling and/or for transporting and/or for assembling a tower segment for a wind turbine and/or a tower section of a wind turbine and/or a tower of a wind turbine, comprising two flange sections for fastening the flange frame in a releasable manner on a horizontal flange of a tower segment, also comprising a lifting bolt for the engagement of a sling-like lifting unit, and further comprising a supporting element for supporting the flange frame on a standing surface.

The flange frame described here can be arranged in a releasable manner, by way of its two flange sections on a horizontal flange of a tower segment. By means of the supporting element of the flange frame, the flange frame can be supported on a standing surface, for example on a ground surface, on a transportation surface of a transportation vehicle or on another flange frame. It is thus also possible for a tower segment which is fastened on the flange frame to be supported on the standing surface. This is in particular preferred during preassembly, where for example further elements can be fitted on a tower segment, for instance tower fittings in the form of ladders, cable harnesses and holders therefor or other supply devices for a tower. Support is likewise preferred for the transportation of tower segments.

The flange frame described here can preferably also be used for other elements and/or components.

The flange frame also has a lifting bolt, on which a sling-like lifting unit can engage. A sling-like lifting unit is understood here, in particular, to mean a lifting unit which, rather than having a hook for engagement on an element which is to be lifted, has a sling or loop, which can be formed for example by a chain and/or a cable and/or a strap. The lifting bolt is therefore understood here to mean, in particular, a protrusion which projects from a surface and can be for example essentially cylindrical. A sling-like lifting unit can engage on a lifting bolt, in particular by virtue of a sling or loop of the sling-like lifting unit being guided over an end of the lifting bolt and butting against part of an outer circumferential surface of the lifting bolt. This is in particular preferred for raising and/or lowering a tower segment and/or for various movements of the tower segment. In particular during assembly, but also during transportation and/or preassembly, the tower segments have to be moved from one position to another, the lifting bolt being particularly suitable for this purpose.

The flange frame is preferably designed such that the lifting bolt is located at a central point of gravity and/or a point of rotation, and/or along a central line of gravity and/or a line of rotation, of the tower segment.

The flange frame is thus suitable for the preassembly and for the transportation and the (definitive) assembly of a tower segment. One advantage is that there is no need for any further elements or devices for supporting, or for the engagement of, a sling-like lifting unit, since both the lifting bolt and the supporting element are arranged on the flange frame.

It is possible for tower segments and/or tower sections to be formed from steel or to comprise steel or to be formed from concrete, in particular reinforced concrete and/or prestressed concrete or to comprise the same. Towers containing both steel segments and/or steel sections and concrete segments and/or concrete sections are also referred to as hybrid towers.

A tower segment preferably has a lower horizontal flange and an upper horizontal flange, as seen in the installed state, said horizontal flanges serving, in particular, to connect the tower segment to essentially vertically adjacent elements of the tower, as seen in the installed state. Furthermore, a tower segment preferably has two or more vertical flanges, which serve in particular to connect the tower segment to essentially horizontally adjacent elements of the tower, as seen in the installed state.

According to a preferred embodiment, the flange frame comprises a transportation module and a lifting module, wherein the transportation module and the lifting module are connected to one another in a releasable manner. The transportation module serves preferably for transporting and/or storing tower segments. The lifting module serves preferably to move a tower segment.

The flange frame and/or the transportation module and/or the lifting module preferably consist/consists wholly or partially of steel or contain/contains steel.

It is also preferred for the transportation module to comprise the two flange sections and the supporting element. The lifting module preferably comprises the lifting bolt. These configurations are particularly preferred in order to allow for the transportation module to support the tower segment via the flange frame and to allow for the lifting module to move and/or alter the position of the tower segment.

It is also preferred for the two flange sections to be spaced apart from one another in the circumferential direction of the horizontal flange.

A preferred embodiment makes provision for the flange frame to comprise three flange sections, wherein the three flange sections are spaced apart from one another preferably in the circumferential direction of the horizontal flange.

A supporting element can preferably have a connecting element, in particular at one end or both ends of the supporting element. The connecting element can preferably be a standard connecting element and/or be suitable for a standard connection. In particular it is preferred for the connecting element to be suitable for connections to ISO containers and/or to have properties which correspond to the connecting elements of ISO containers, in particular so-called quick-lock connecting elements.

A further preferred embodiment makes provision for the flange frame to comprise two, three or more supporting elements. The two, three or more supporting elements are preferably spaced apart from one another.

It is also preferred for the flange frame to comprise an engagement element for the engagement of a lifting unit. An engagement element for the engagement of a lifting unit can be designed, for example, in the form of a through-hole, eyelet, shackle or the like. The engagement element is preferably suitable for the engagement of a hook-like lifting unit, wherein preferably the hook of the hook-like lifting unit can engage through an opening of the engagement element by way of a hook tip. The engagement element is preferably arranged on the lifting module and/or on the transportation module.

It is also preferred for the flange frame to comprise two, three or more engagement elements.

A preferred embodiment makes provision for the supporting element to be designed such that it does not extend beyond an outer surface of the tower-segment wall when the flange frame is fitted on the horizontal flange of the tower segment. The supporting element is preferably designed such that the supporting element is arranged outside a flange plane when the flange frame is fitted on the horizontal flange of the tower segment.

It is also preferred for the supporting element to be designed such that it extends beyond a plane which connects two vertical flanges of the tower segment when the flange frame is fitted on the horizontal flange of the tower segment.

The plane which connects two vertical flanges of the tower segment is preferably an imaginary plane, and runs preferably parallel to a longitudinal axis of the tower segment or of a tower having the tower segment. The supporting element extends preferably in a plane which is orthogonal to a longitudinal axis of the tower segment or of a tower having the tower segment.

These configurations are in particular preferred in order for it to be possible for a tower segment to be supported for example on a ground surface or a transportation surface. This preferably creates a distance between the standing surface and the tower segment, as a result of which damage to the tower segment can be prevented or reduced.

In particular it is preferred for the supporting element to be designed such that a lower end of the supporting element, as seen in the transportation state, is supported on an upper end of a further supporting element, which is arranged on a horizontal flange of a further tower segment. This allows tower segments to be stacked one upon the other by means of the flange frames, which is preferred in particular during transportation.

A preferred development is distinguished in that the supporting element is designed such that a lower end of the supporting element, as seen in the transportation state, is supported on an upper end of a further supporting element, which is arranged on a horizontal flange of a further tower segment, such that the tower segments are spaced apart from one another.

This is in particular preferred in order for it to be possible for a plurality of tower segments to be stacked one above the other. The supporting element is preferably designed such that a lower end of the supporting element, as seen in the transportation state, is supported on an upper end of a further supporting element, which is arranged on a horizontal flange of a further tower segment, such that the tower segments are fully spaced apart from one another. Full spacing apart understood, in particular, to mean that, rather than the tower segments being in contact, it is only the flange frames, arranged on the horizontal flanges, which are in contact.

This makes it possible to reduce or avoid damage to the tower segments during transportation and/or storage.

In a further preferred embodiment, the flange frame has one, two or more points of strut engagement. A point of strut engagement preferably serves for one or more struts to be fastened thereon in a releasable manner. The struts can serve, in particular, to connect to one another two flange frames each arranged on a horizontal flange of different tower segments. For this purpose, the struts can preferably designed to be alterable in length, for example in the form of hydraulic rams.

According to a further aspect of the invention, provided is an assembly set for preassembling and/or for transporting and/or for assembling a tower segment for a wind turbine and/or a tower section of a wind turbine, comprising a previously described flange frame.

The assembly set preferably comprises two, three or more previously described flange frames. In particular, it is preferred for a tower segment to have a respective flange frame arranged both on an upper horizontal flange and on a lower horizontal flange, as seen in the installed state.

In a further preferred embodiment, the assembly set comprises a lifting module and a first transportation module and a second transportation module, wherein the first and second transportation modules are, or can be, of different designs.

It is also preferred for the assembly set to comprise a plurality of identically designed lifting modules. According to a preferred embodiment of the assembly set, the first and second transportation modules have different dimensions.

A preferred embodiment of the assembly set makes provision for the flange sections of the first transportation module to be designed for fastening on an upper horizontal flange of a first tower segment with a first radius and for the flange sections of the second transportation module to be designed for fastening on a lower horizontal flange of the first tower segment with a second radius, wherein the first radius differs from the second radius. This is preferred in particular for tower segments which are used for a tower section which is of tapered and/or frustoconical design. For tower segments of which the upper and lower horizontal flanges have the same radius, for example in cylindrical tower sections, use can preferably also be made of identically designed transportation modules.

Furthermore, a preferred embodiment of the assembly set makes provision for the flange sections of the first transportation module to be designed for fastening on a horizontal flange of a first tower segment with a first radius and for the flange sections of the second transportation module to be designed for fastening on a horizontal flange of a second tower segment with a second radius, wherein the first radius differs from the second radius. A preferred development of the assembly set is distinguished in that the first transportation module has first connecting elements for releasable connection to the lifting module and the second transportation module has second connecting elements for releasable connection to the lifting module. A further preferred embodiment of the assembly set makes provision for the positions of the first and second connecting elements to differ.

The assembly set and the preferred configurations thereof have the advantage that, for tower segments with different dimensions, all that is necessary is for appropriately coordinated transportation modules to be kept in stock, but these can be combined with lifting modules which are of identical design. This makes it possible to use a lifting module with a multiplicity of differently designed transportation modules. The connecting elements of the different transportation modules are preferably positioned in each case such that the lifting bolt of a lifting module connected thereto is located at a central point of gravity and/or a point of rotation, and/or along a central line of gravity and/or a line of rotation, of the respective tower segment.

The assembly set preferably also has at least one strut and/or at least a connecting-flange piece.

In a preferred configuration, the assembly set also has two or more connecting-flange pieces and/or two or more struts and/or at least two different struts and/or at least two different connecting-flange pieces.

According to a further aspect of the invention, provided is a method for preassembling and/or for transporting and/or for assembling a tower segment for a wind turbine and/or a tower section of a wind turbine and/or a tower of a wind turbine, comprising fastening the flange sections of a previously described flange frame on a horizontal flange of a tower segment,
    fitting a sling-like lifting unit on the lifting bolt, and
    raising the flange frame by means of the sling-like lifting unit.

The operation of fastening the flange sections of a previously described flange frame on a horizontal flange of a tower segment preferably comprises the operation of fastening the transportation module on the horizontal flange of the tower segment and the operation of fastening the lifting module on the transportation module.

According to a further aspect of the invention, provided is a method for transporting a tower segment for a wind turbine and/or a tower section of a wind turbine and/or a tower of a wind turbine, comprising fastening the flange sections of a first previously described flange frame on a horizontal flange of a first tower segment,
    fastening the flange sections of a second previously described flange frame on a horizontal flange of a second tower segment, and
    arranging the two tower segments one above the other such that a lower end of the supporting element of the first flange frame is supported on an upper end of the supporting element of the second flange frame.

According to a further aspect of the invention, provided is a method for preassembling and/or for assembling a tower segment for a wind turbine and/or a tower section of a wind turbine and/or a tower of a wind turbine, comprising fastening the flange sections of a first previously described flange frame on a horizontal flange of a first tower segment,
    fastening the flange sections of a second previously described flange frame on a horizontal flange of a second tower segment,
    arranging the two tower segments one beside the other such that a first vertical flange of the first tower segment and a first vertical flange of the second tower segments are located opposite one another,
    connecting the horizontal flanges of the two tower segments by means of a connecting-flange piece, and
    connecting the two flange frames by means of a strut.

The method for preassembling and/or for assembling a tower segment for a wind turbine and/or a tower section of a wind turbine and/or a tower of a wind turbine also preferably comprises altering the distance between a second vertical flange of the first tower segment and a second vertical flange of the second tower segment in relation to one another by means of the strut.

The two flange frames are preferably connected to one another by means of two different struts, in particular two struts of different lengths.

The method for preassembling and/or for assembling a tower segment for a wind turbine and/or a tower section of a wind turbine and/or a tower of a wind turbine also preferably comprises connecting the first vertical flange of the first tower segment to the first vertical flange of the second tower segment.

The method for preassembling and/or for assembling a tower segment for a wind turbine and/or a tower section of a wind turbine and/or a tower of a wind turbine also preferably comprises fastening the flange sections of a third previously described flange frame on a horizontal flange of a third tower segment,
    arranging the three tower segments one beside the other such that a second vertical flange of the first tower segment and a first vertical flange of the third tower segment are located opposite one another and a first vertical flange of the second tower segment and a second vertical flange of the third tower segment are located opposite one another,
    connecting the horizontal flange of the third tower segment to the two horizontal flanges of the first and second tower segments by means of two connecting-flange pieces, and
    connecting the flange frame of the third tower segment to the two flange frames of the first and second tower segments by means of two struts.

The method for preassembling and/or for assembling a tower segment for a wind turbine and/or a tower section of a wind turbine and/or a tower of a wind turbine also preferably comprises connecting the second vertical flange of the first tower segment to the first vertical flange of the third tower segment and connecting the first vertical flange of the second tower segment to the second vertical flange of the third tower segment.

The steps described here preferably apply equally to oppositely located horizontal flanges of a tower segment, in particular a lower horizontal flange and an upper horizontal flange, as seen in the installed state.

The steps described here preferably equally apply to tower sections which comprise more or fewer than three tower segments, for example one tower segment or two, four, five or further tower segments.

According to a further aspect of the invention, provided is a use of a previously described flange frame in a previously described method.

According to a further aspect of the invention, provided is a wind turbine comprising a tower segment and/or a tower section which has been preassembled and/or transported and/or assembled in accordance with the previously described method.

According to a further aspect of the invention, provided is a tower segment for a tower of a wind turbine, comprising a previously described flange frame, and/or by a tower section of a wind turbine, comprising a previously described flange frame, and/or by a tower of a wind turbine, comprising a previously described flange frame, and/or by a wind turbine comprising a previously described flange frame.

The various further aspects of the invention have features or method steps which render them suitable, in particular, for use with a flange frame according to the invention and the developments thereof.

As far as the advantages, variants and details of said further aspects of the invention and the developments thereof are concerned, reference is made to the above description relating to the corresponding device or apparatus features.

Preferred configurations relating to an element in the singular, for example a flange frame, a flange section, a supporting element, an engagement element, a strut, a tower segment, a horizontal flange, a vertical flange, etc., can preferably likewise apply to two, three or more of these elements.

BRIEF DESCRIPTION OF THE SEVERAL VIEWS OF THE DRAWINGS

Preferred embodiments of the invention will be described by way of example with reference to the accompanying figures, in which:

FIG. 13b shows the transportation module according to FIG. 13a;

FIG. 13c shows the lifting module according to FIG. 13a;

DETAILED DESCRIPTION

Figure 1:
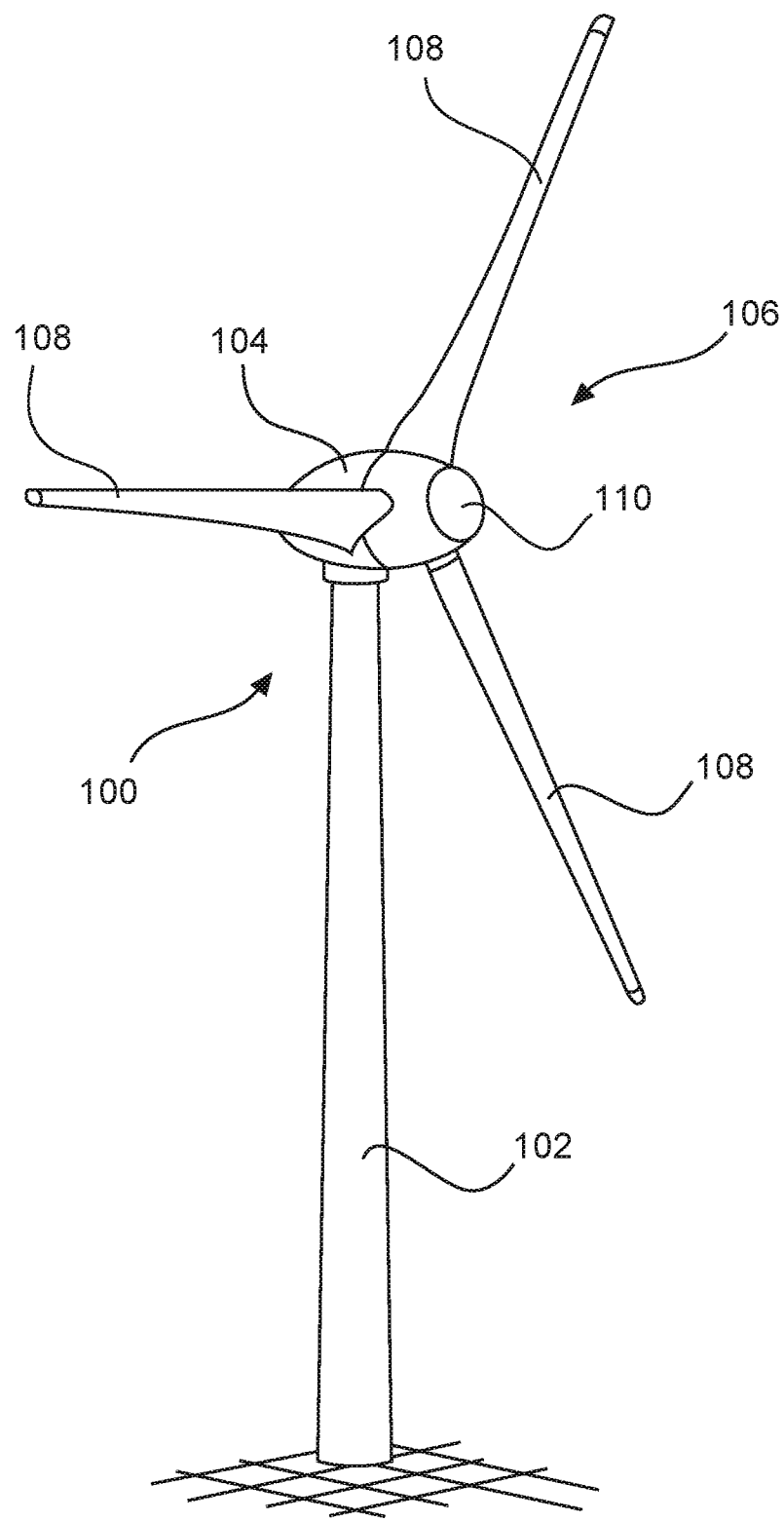
FIG. 1 shows a schematic illustration of a wind turbine.

FIG. 1 shows a schematic illustration of a wind turbine according to the invention. The wind turbine 100 has a tower 102 and a nacelle 104 on the tower 102. An aerodynamic rotor 106 with three rotor blades 108 and a spinner 110 is provided on the nacelle 104. During operation of the wind turbine, the aerodynamic rotor 106 is made to rotate by the wind and thus also rotates an electrodynamic rotor of a generator, which is coupled directly or indirectly to the aerodynamic rotor 106. The electric generator is arranged in the nacelle 104 and generates electrical energy. The pitch angles of the rotor blades 108 can be altered by pitch motors at the roots of the respective rotor blades 108.

Identical, similar or essentially functionally identical elements are provided with the same reference signs.

Figure 2:
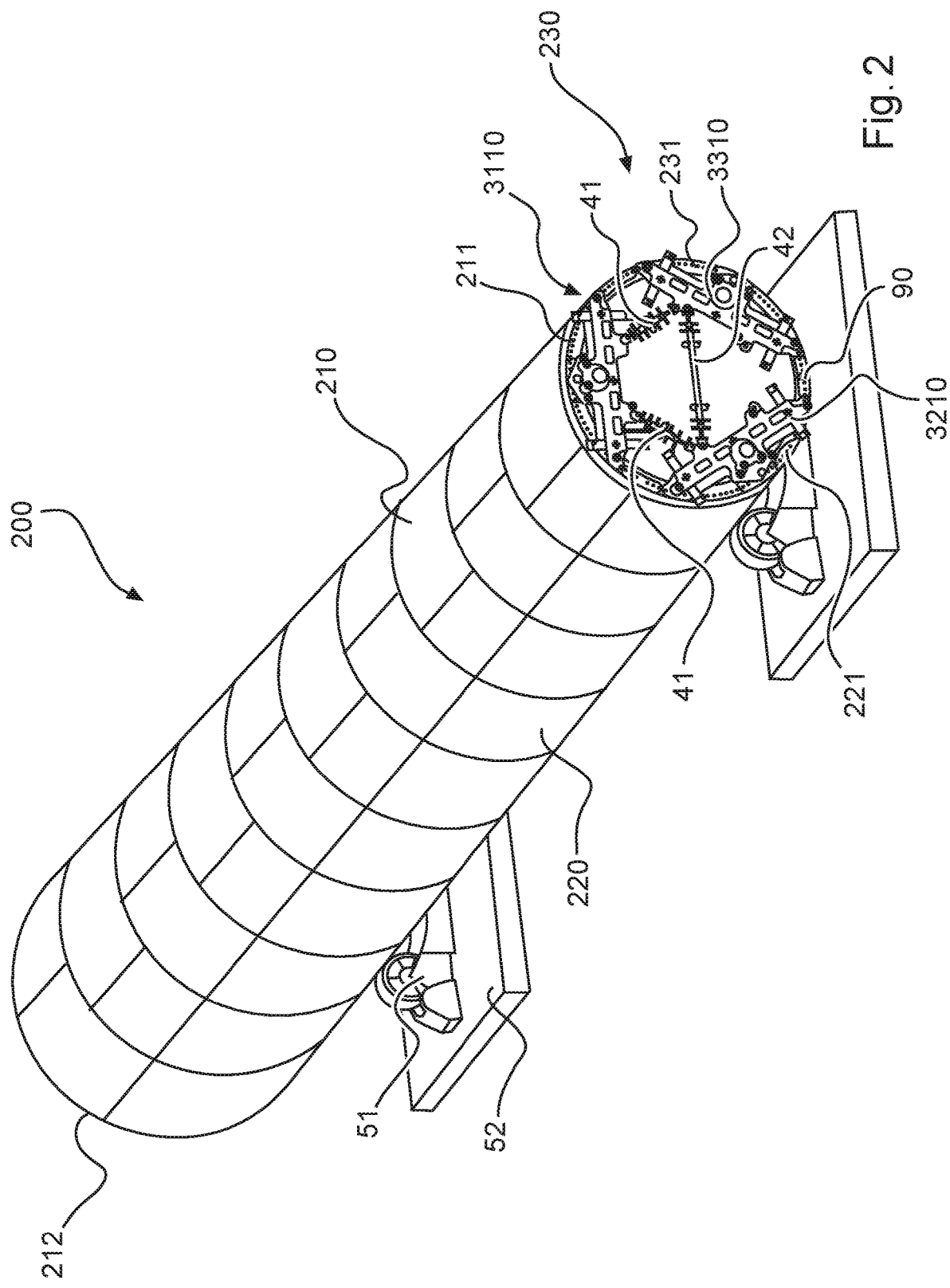
FIG. 2 shows a three-dimensional illustration of a tower section with three tower segments and with flange frames arranged on the horizontal flanges thereof and with further parts of an assembly set.

FIG. 2 shows a three-dimensional illustration of a tower section 200 with three tower segments 210, 220, 230, and with flange frames arranged on the horizontal flanges 211, 221, 231 thereof, on a roller bearing 51 on a base 52.

Figure 3A:
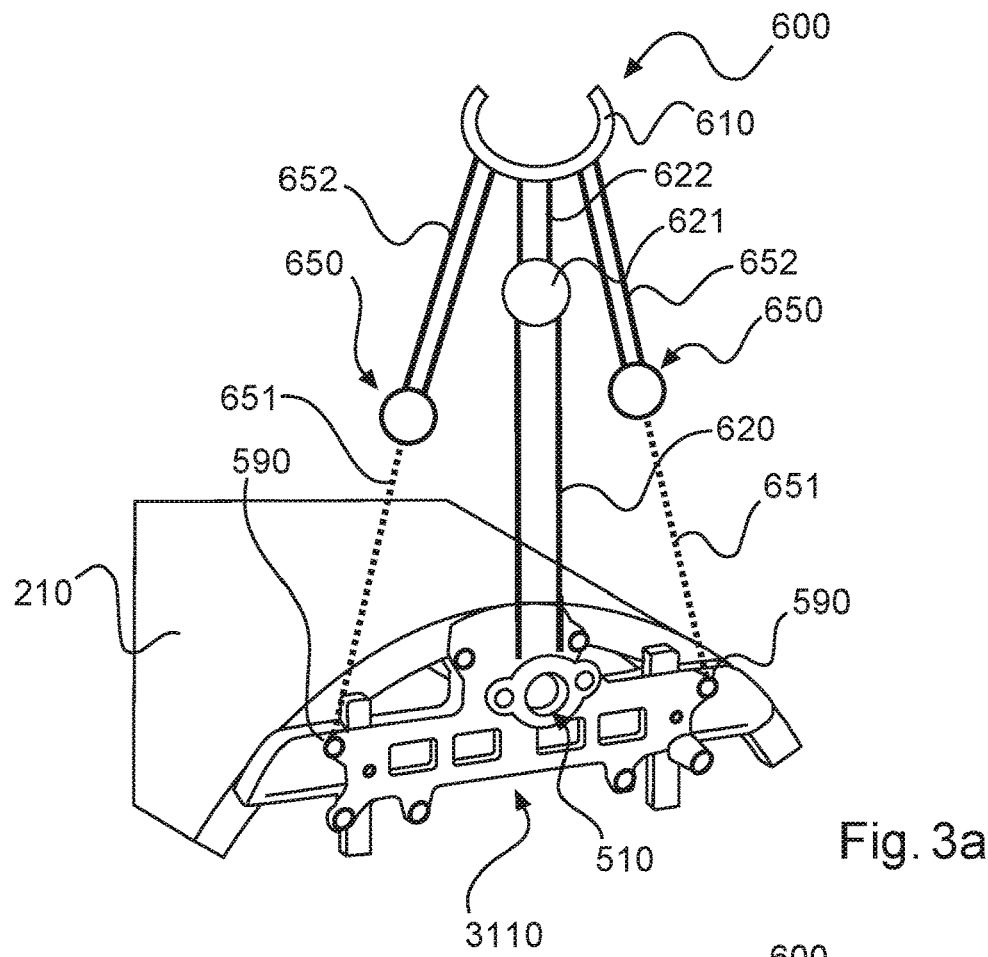
FIG. 3a shows a detail of a tower segment with a flange frame arranged thereon and with a lifting unit in a first position.
Figure 3B:
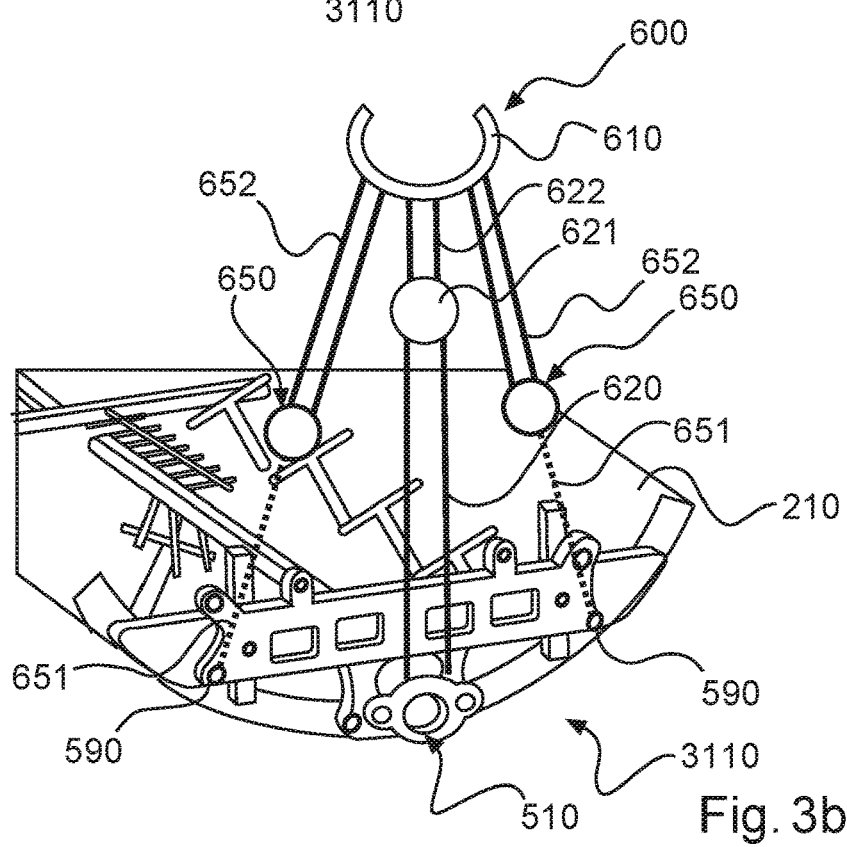
FIG. 3b shows a detail of a tower segment with a flange frame arranged thereon and with a lifting unit in a second position.

FIGS. 3a and b illustrate a detail of a tower segment 210 with a flange frame 3110 arranged thereon and with a lifting unit 600, to be precise FIG. 3a illustrating a first position and FIG. 3b illustrating a second position, in which the tower segment 210 has been rotated in relation to the first position, which is illustrated in FIG. 3a. Also illustrated, in schematic form, is a sling-like lifting unit, which engages on the lifting bolt 510 by way of a round sling 620. The round sling 620 is fastened in a crane hook 610 if appropriate via a shackle 621 and a further round sling 622. In the two positions, in addition, in each case a pulley 650, with a chain 651 belonging to the pulley, and a round sling 652, which is likewise fastened on the crane hook 610, are attached to two different engagement elements 590 in each case.

Figure 4A:
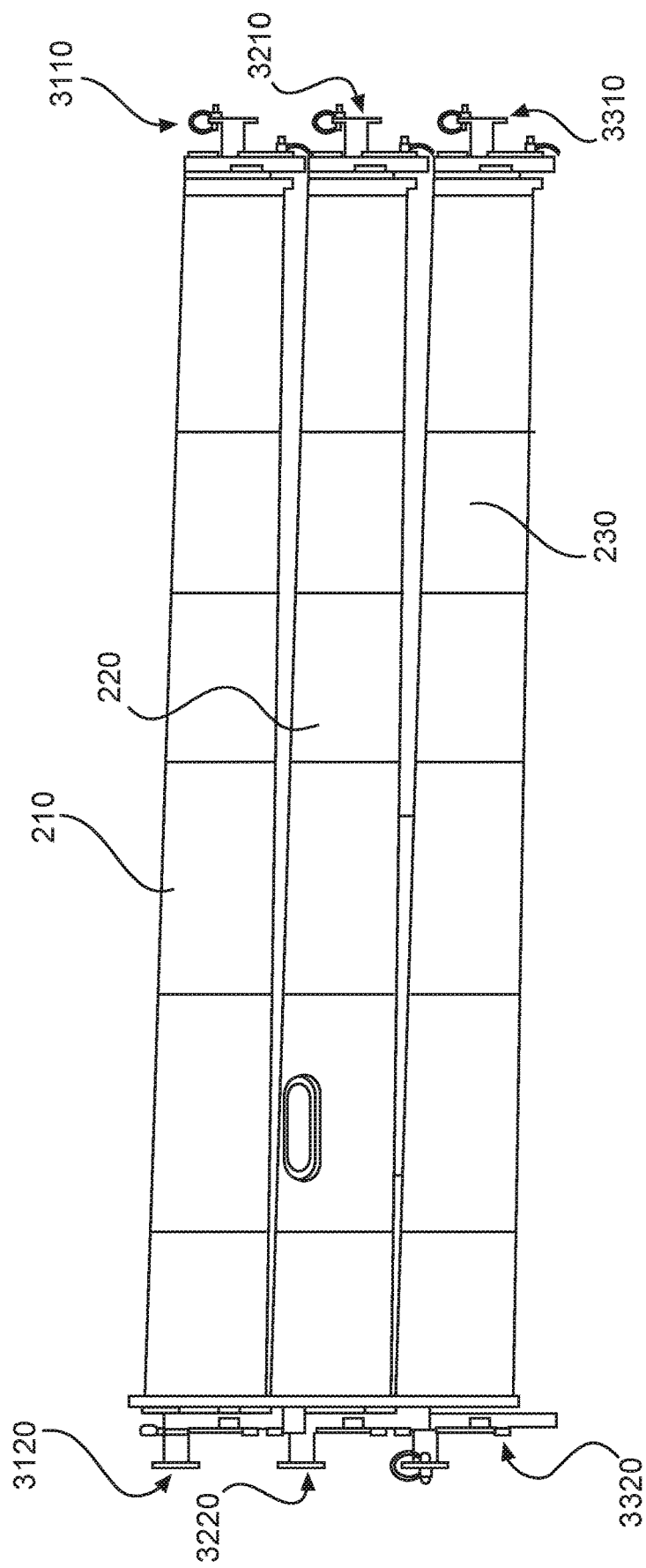
FIG. 4a shows a side view of three tower segments stacked by means of flange frames.

FIGS. 4a and b show three tower segments 210, 220, 230, which are stacked one above the other via flange frames 3110, 3210, 3310, 3120, 3220, 3320 arranged on the upper and lower horizontal flanges of said tower segments. The tower segments 210, 220, 230 are thus spaced apart from one another, preferably fully, and it is therefore possible to reduce or avoid damage to the tower segments during storage and/or during transportation. The supporting elements are designed such that a lower end of the supporting element, as seen in the transportation state, is supported on an upper end of a further supporting element, which is arranged on a horizontal flange of a further tower segment. The supporting elements are also designed such that, in the state in which they are fitted on the horizontal flange of the tower segment, they do not extend beyond an outer surface of the tower-segment wall.

In the configuration according to FIG. 4a, the supporting elements are also designed such that, in the state in which they are fitted on the horizontal flange of the tower segment, they extend beyond a plane which connects two vertical flanges of the tower segment. This has the advantage of providing for good spacing apart of the tower segments in the downward direction.

Figure 4B:
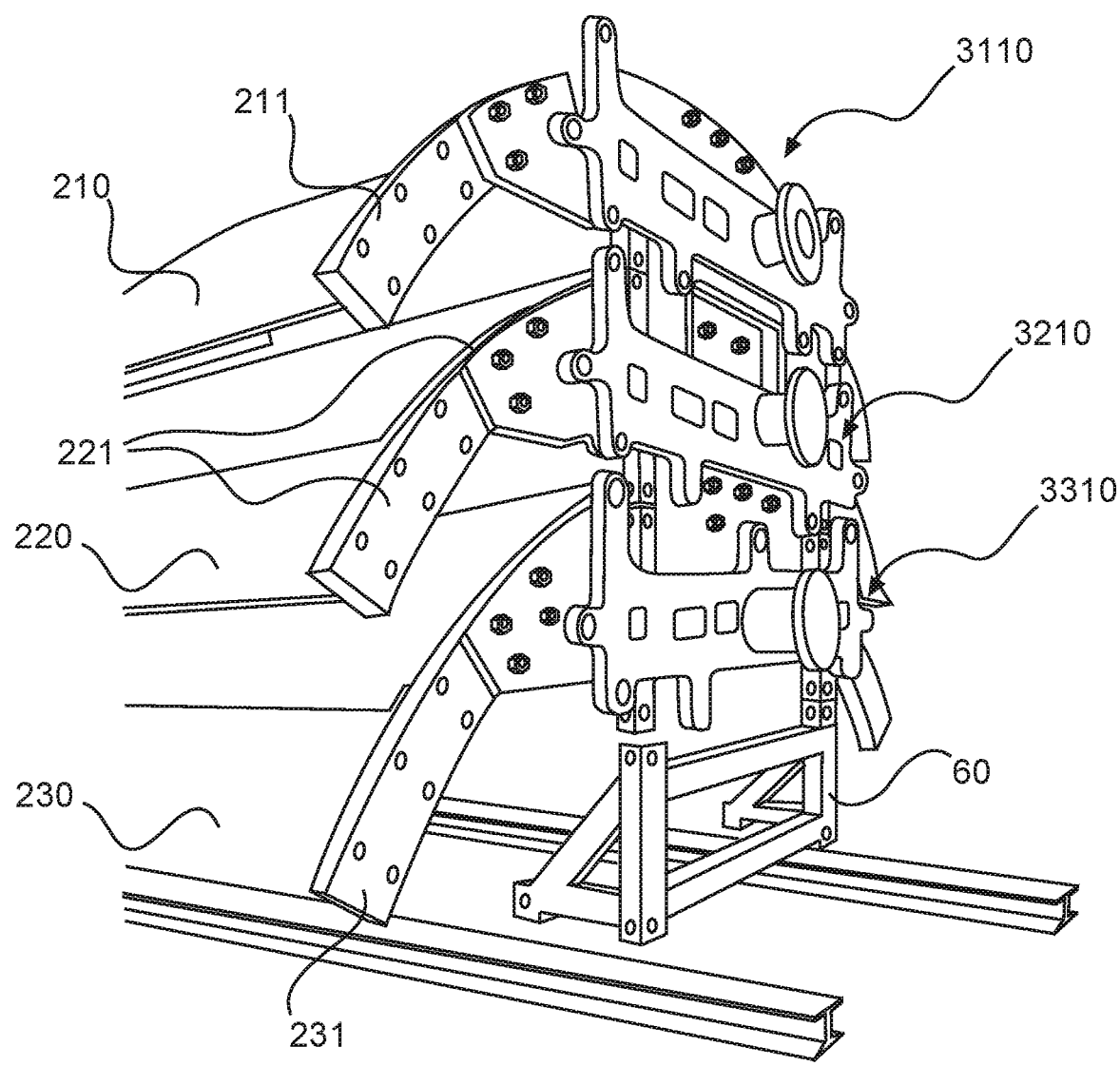
FIG. 4b shows a detail of a three-dimensional illustration of three tower segments stacked by means of flange frames.

In the configuration according to FIG. 4b, in the state in which they are fitted on the horizontal flange of the tower segment, the supporting elements do not extend beyond a plane which connects two vertical flanges of the tower segment. Nevertheless, as can be seen in FIG. 4b, spacing apart of the tower segments from one another is achieved. However, a supporting frame 60 is arranged beneath the lowermost flange frame, said supporting frame creating the necessary distance in relation to the ground.

Figure 5:
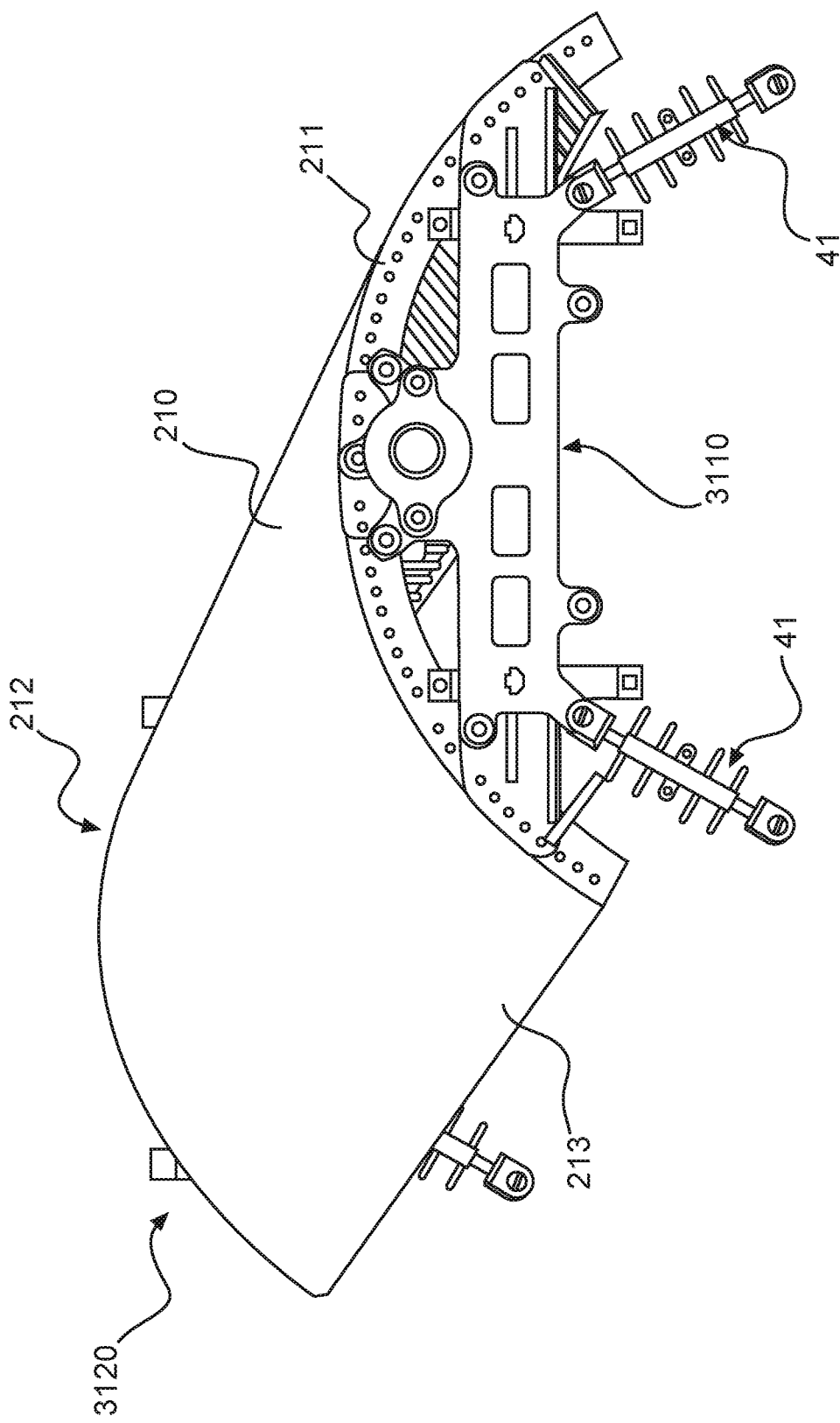
FIG. 5 shows a three-dimensional illustration of a tower section with a flange frame arranged thereon and with further parts of an assembly set.
Figure 6:
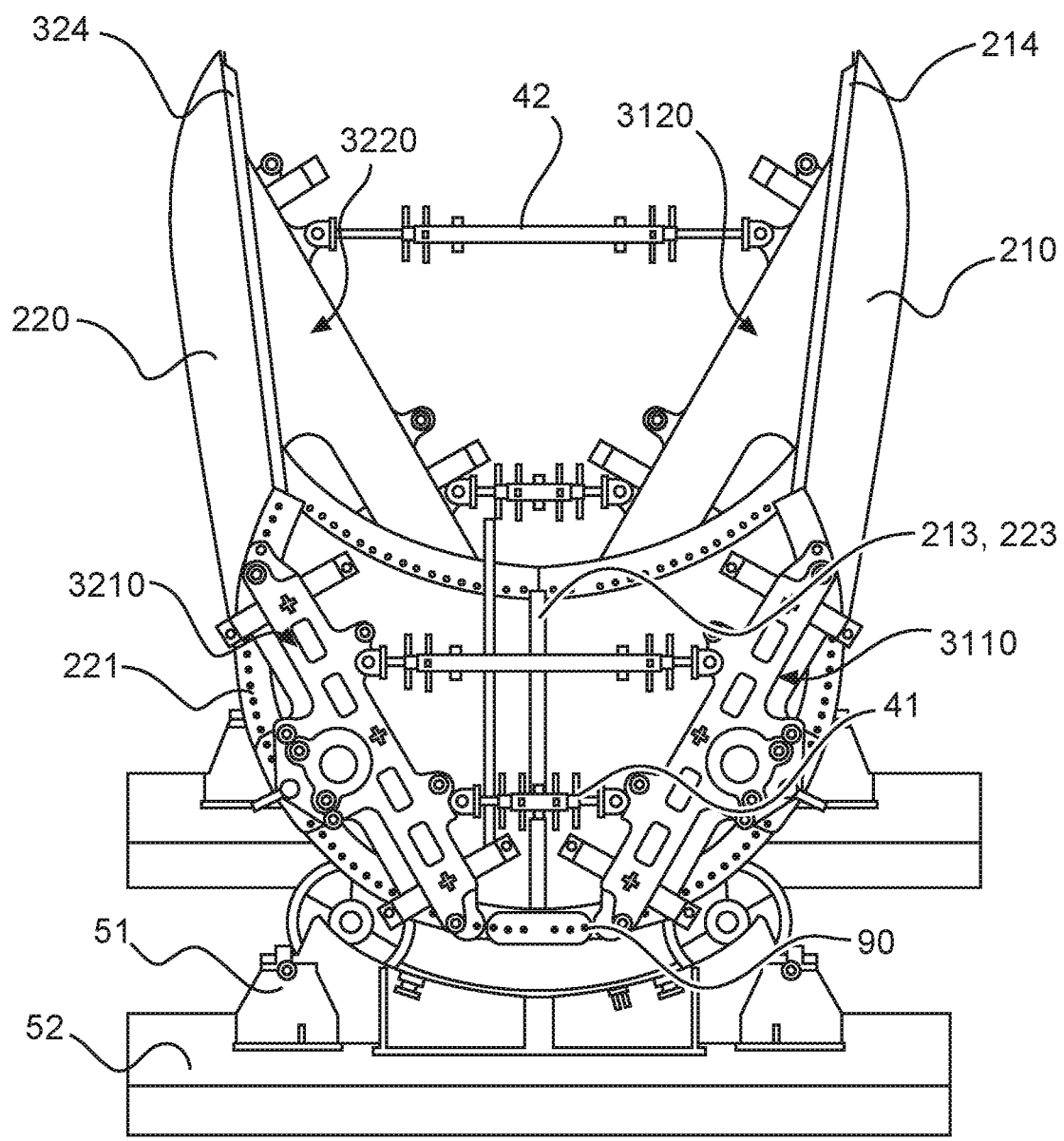
FIG. 6 shows a three-dimensional illustration of two tower sections with flange frames arranged thereon and with further parts of an assembly set.
Figure 7A:
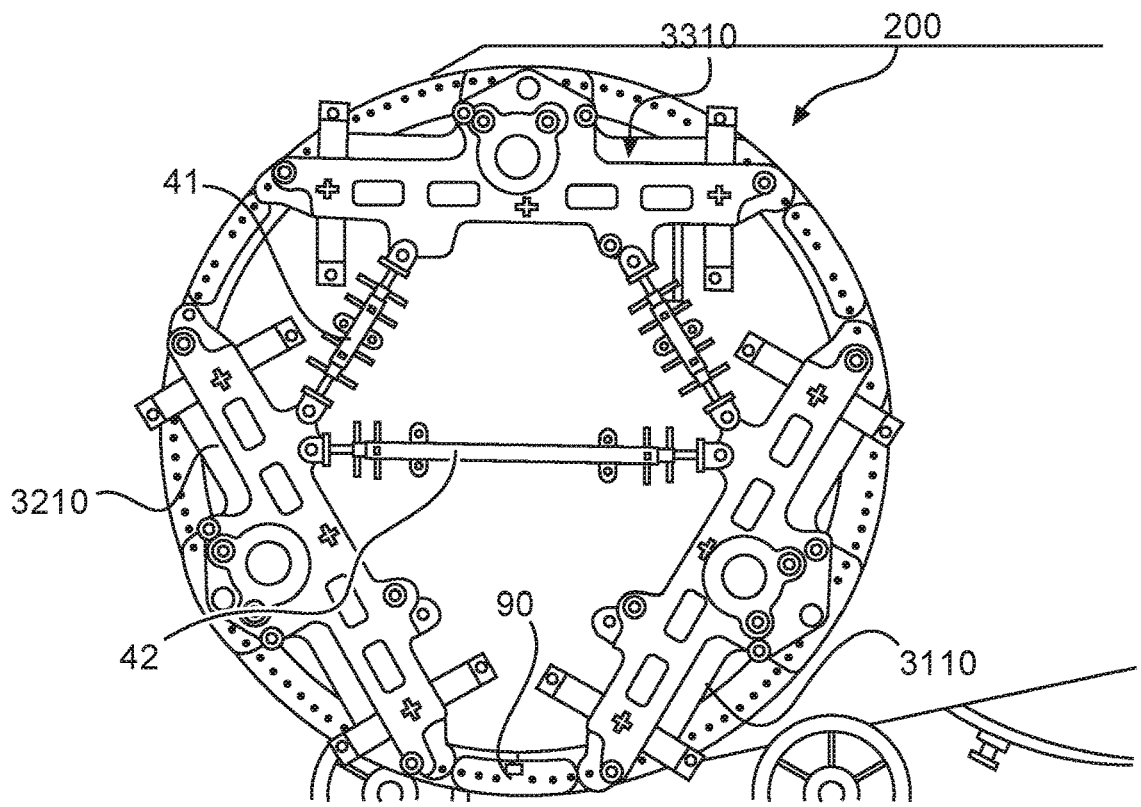
FIG. 7a shows a three-dimensional illustration of three tower sections with flange frames arranged on the upper horizontal flanges and with further parts of an assembly set.
Figure 7B:
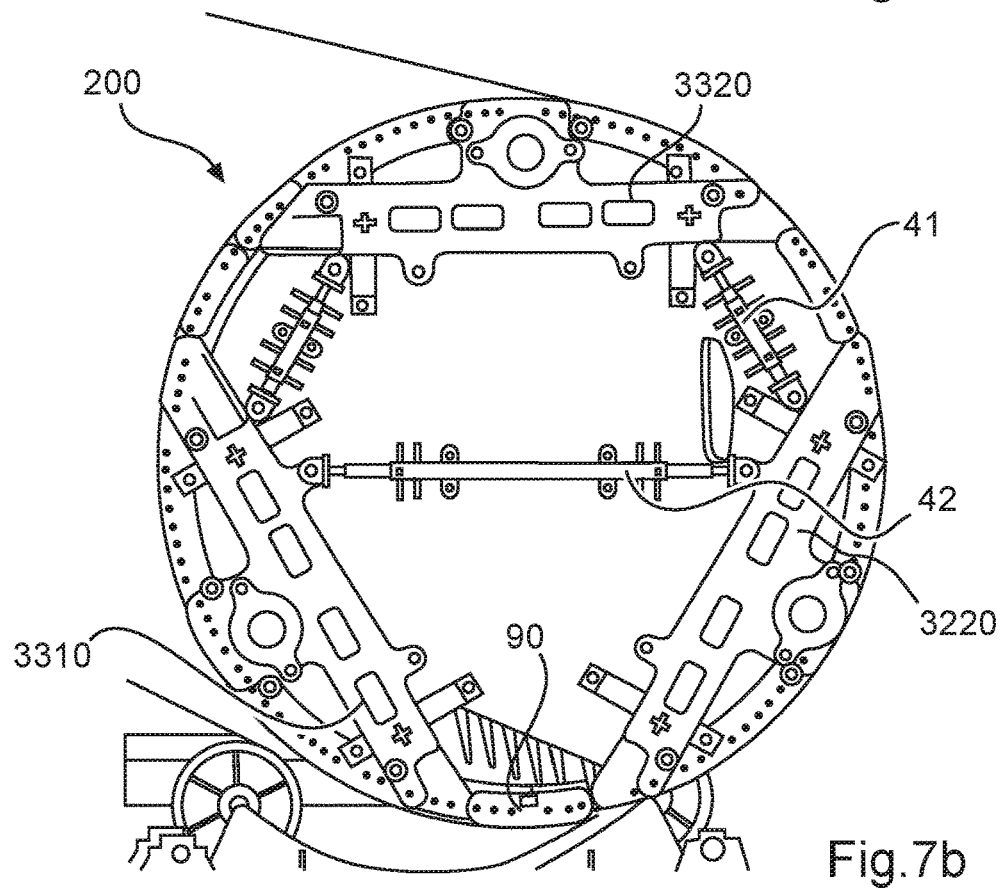
FIG. 7b shows a three-dimensional illustration of three tower sections with flange frames arranged on the lower horizontal flanges and with further parts of an assembly set.

FIGS. 5, 6, and 7a and b show the assembly of a tower section 200 from three tower segments 210, 220, 230 in different stages. First of all, FIG. 5 illustrates a tower segment 210, which has a respective flange segment 3110, 3120 with two short struts 41 arranged on its upper and lower horizontal flanges 211, 212. FIG. 6 illustrates a second tower segment 220, which likewise has a respective flange frame 3210, 3220 arranged on its upper and lower horizontal flanges. The two tower segments 210, 220 are connected to one another via connecting-flange pieces 90. The two flange frames 3110, 3210, which are arranged on the upper horizontal flanges, are connected to one another via a short and a long strut 41, 42, in the same way as the two flange frames 3120, 3220, which are arranged on the two lower horizontal flanges, are connected to one another via a short and a long strut 41, 42. The struts 41, 42 are preferably alterable in length. An alteration in length of the struts 41, 42 can thus be used to alter the distance between the two tower segments 210, 220. This is in particular advantageous in order for it to be possible for the third tower segment 230 to be assembled accurately. The connection of the two tower segments 210, 220 via the vertical flanges 213, 223 thereof can also be seen in FIG. 6. In FIG. 6, the two tower segments are mounted on a roller bearing 51 on a base 52.

FIGS. 7a and b, then, show the complete tower section 200 with three tower segments 210, 220, 230, which have respective flange frames 3110, 3210, 3310, 3120, 3220, 3320 and connecting-flange pieces 90 arranged on the upper and lower horizontal flanges thereof. The flange frames 3110, 3210, 3310, 3120, 3220, 3320 are connected to one another on the upper and on the lower horizontal flanges in each case by means of two shorter struts 41 and one longer strut 42, in order to stabilize the three tower segments 210, 220, 230, in particular as long as the vertical flanges thereof are not yet connected to one another.

Figure 8:
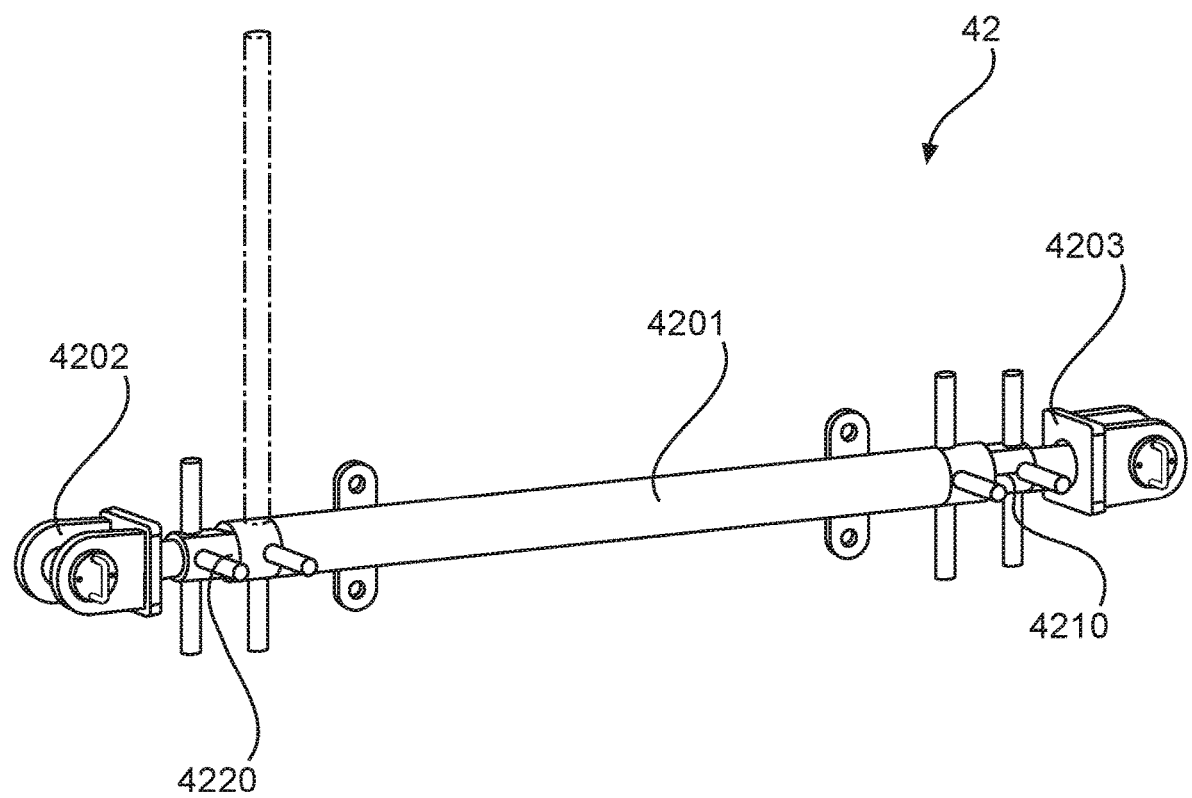
FIG. 8 shows a three-dimensional illustration of a first strut.
Figure 9:
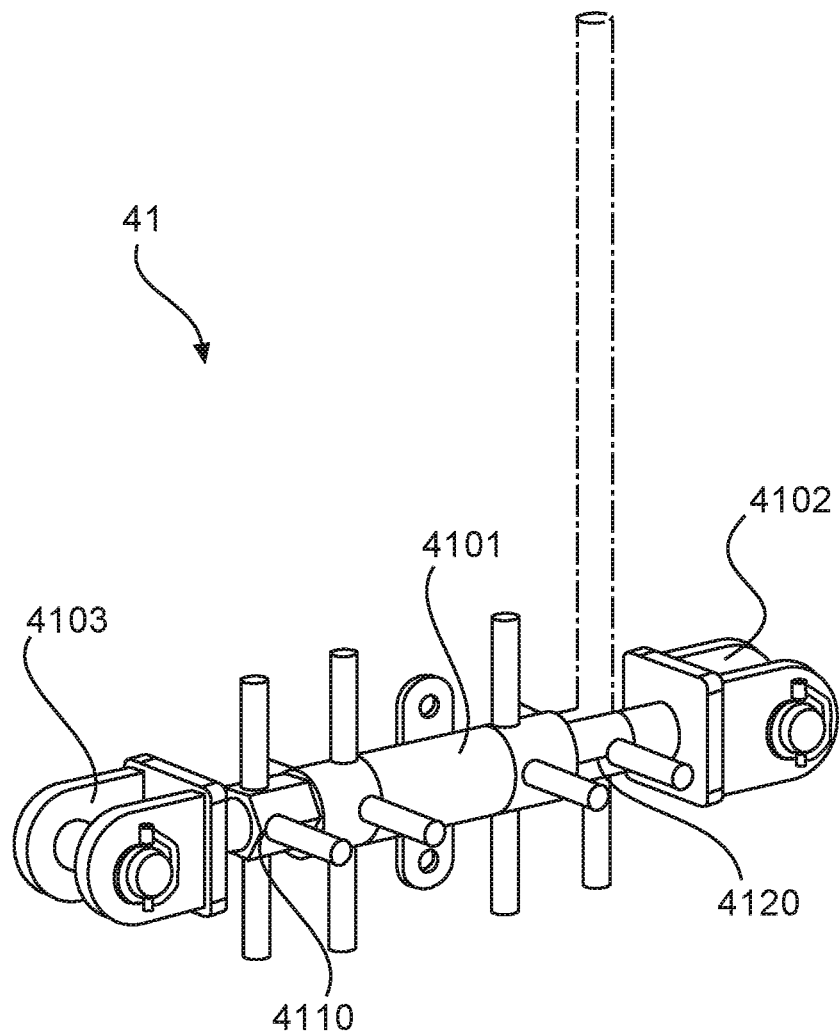
FIG. 9 shows a three-dimensional illustration of a second strut.
Figure 10:
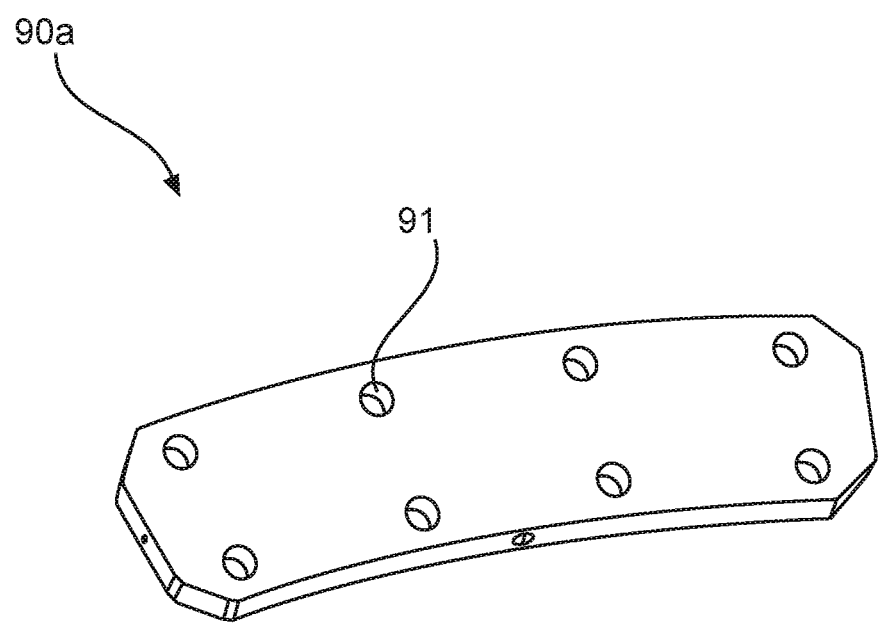
FIG. 10 shows a three-dimensional illustration of a first connecting-flange piece.
Figure 11:
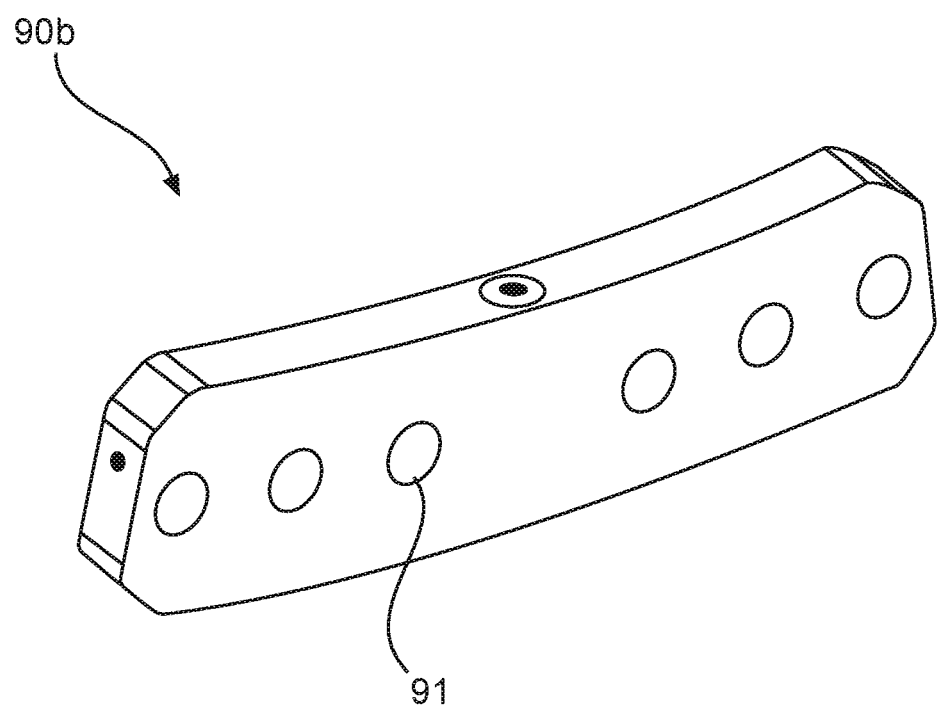
FIG. 11 shows a three-dimensional illustration of a second connecting-flange piece.

FIGS. 8 and 9 show exemplary embodiments of struts 41, 42 with core pieces 4101, 4201, connection pieces 4102, 4103, 4202, 4203 and telescopic pieces 4110, 4120, 4210, 4220. FIGS. 10 and 11 show exemplary illustrations of connecting-flange pieces 90a, 90b with through-openings 91 for accommodating fastening elements, for example screws.

Figure 12:
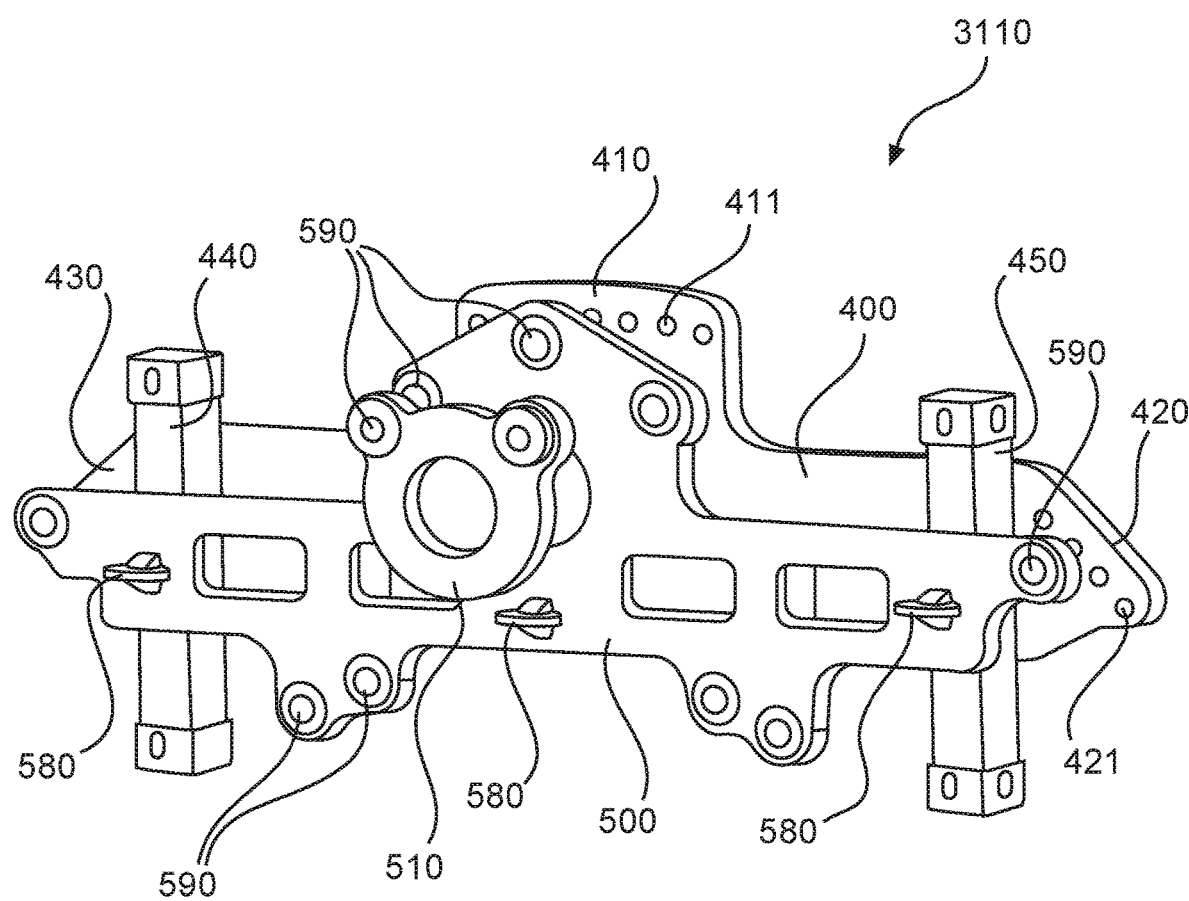
FIG. 12 shows a three-dimensional illustration of an embodiment of a flange frame and further parts of an assembly set.

FIG. 12 shows a three-dimensional illustration of an embodiment of a flange frame 3110 with a transportation module 400 and a lifting module 500, wherein in this case the transportation module 400 and the lifting module 500 are formed integrally with one another, in one piece, as a single component. The transportation module 400 has three flange sections 410, 420, 430 with through-openings 411, 421, 431 for accommodating fastening elements, for example screws. Also provided are two supporting elements 440, 450. The lifting module 500 has a lifting bolt 510 and also a plurality of engagement elements in the form of through-openings 590 and in the form of eyelets 580. The engagement elements, in particular the eyelets 580, can be part of the flange frame and/or part of the assembly set.

Figure 13A:
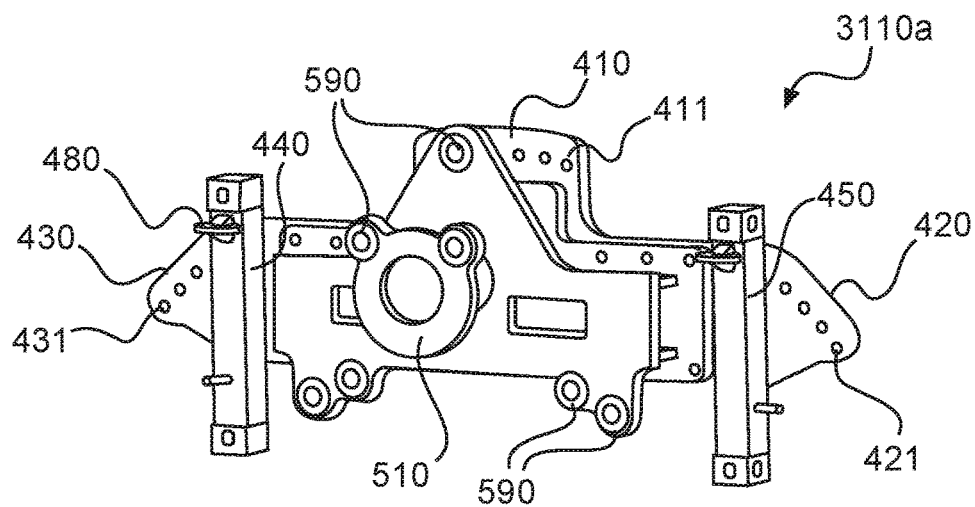
FIG. 13a shows a three-dimensional illustration of an embodiment of a flange frame with a transportation module and a lifting module.
Figure 13B:
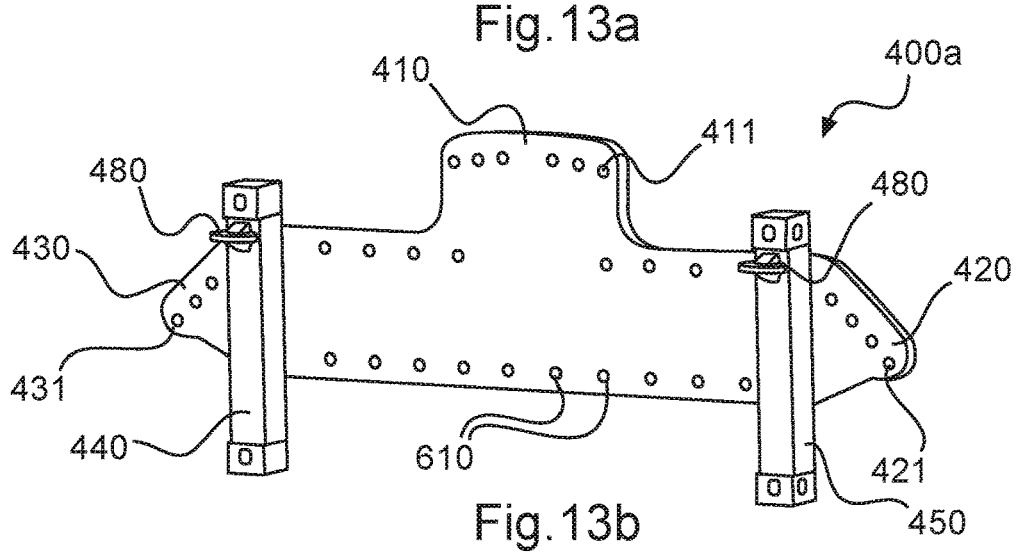
Figure 13C:
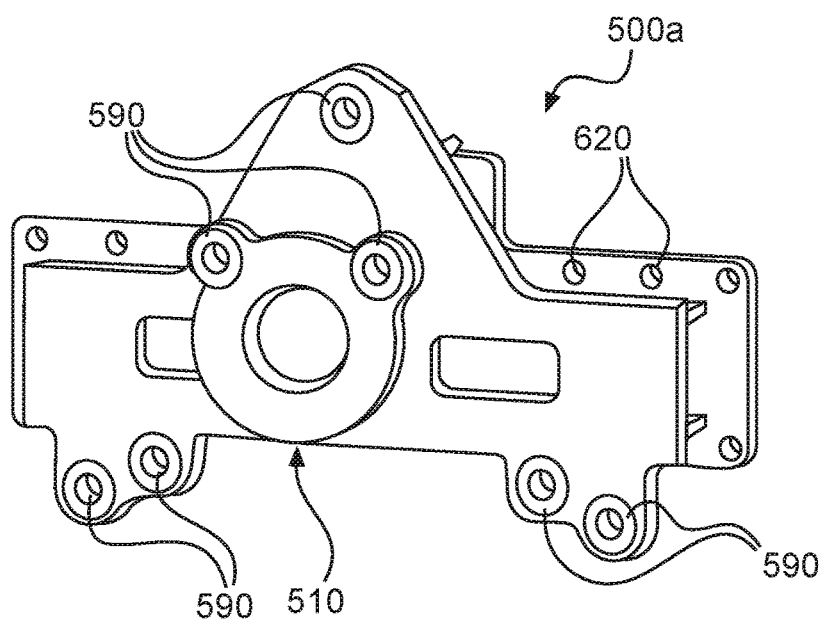

FIGS. 13a, b and c show an embodiment of a flange frame 3110a with a transportation module 400a and a lifting module 500a, which in the embodiment shown here, in contrast to the embodiment in FIG. 12, can be, or are, connected to one another in a releasable manner. It is possible in this way for a lifting module 500a with a lifting bolt 510 arranged thereon to be used with a multiplicity of different transportation modules 400a. With the exception of the releasability of the connection between the transportation module 400a and the lifting module 500a, the flange frame 3110a can be designed in a manner identical or similar to the flange frame 3110.

For example, an assembly set can be formed by means of two different transportation modules and one lifting module. It is preferably also possible for one or more connecting-flange pieces, as shown for example in FIGS. 10 and 11, and/or for one or more struts, as shown for example in FIGS. 8 and 9, to be part of the assembly set.

An assembly set has the advantage that, for tower segments with different dimensions, all that is necessary is for appropriately coordinated transportation modules to be kept in stock, but these can be combined with lifting modules which are of identical design. This makes it possible to use one lifting module with a multiplicity of differently designed transportation modules. The connecting elements of the different transportation modules are preferably positioned in each case such that the lifting bolt of one lifting module connected thereto is located at a central point of gravity and/or a point of rotation, and/or along a central line of gravity and/or a line of rotation, of the respective tower segment.

Figure 14A:
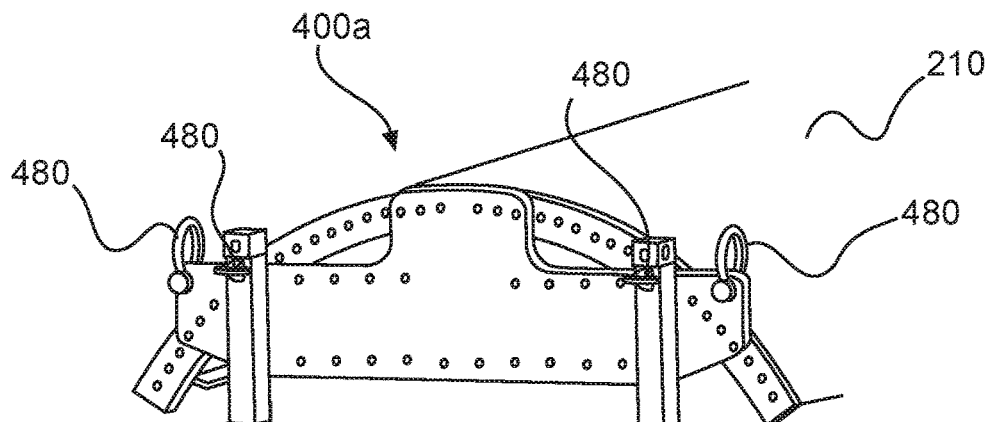
FIG. 14a shows a three-dimensional illustration of a variant of a transportation module.
Figure 14B:
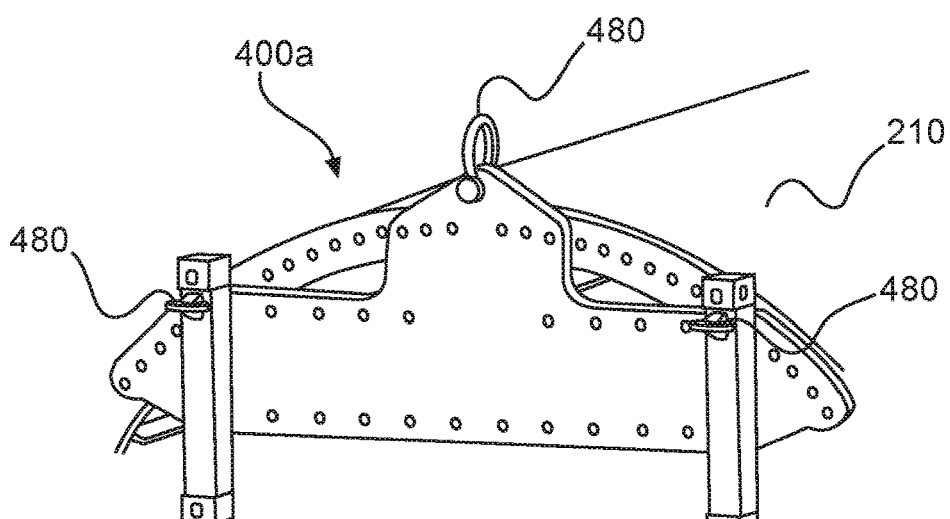
FIG. 14b shows a three-dimensional illustration of a further variant of a transportation module.
Figure 14C:
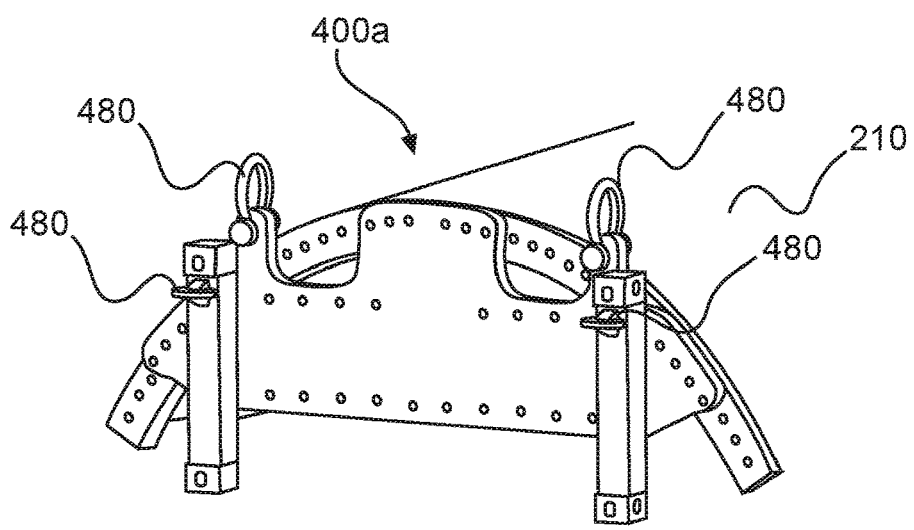
FIG. 14c shows a three-dimensional illustration of a further variant of a transportation module.
Figure 15A:
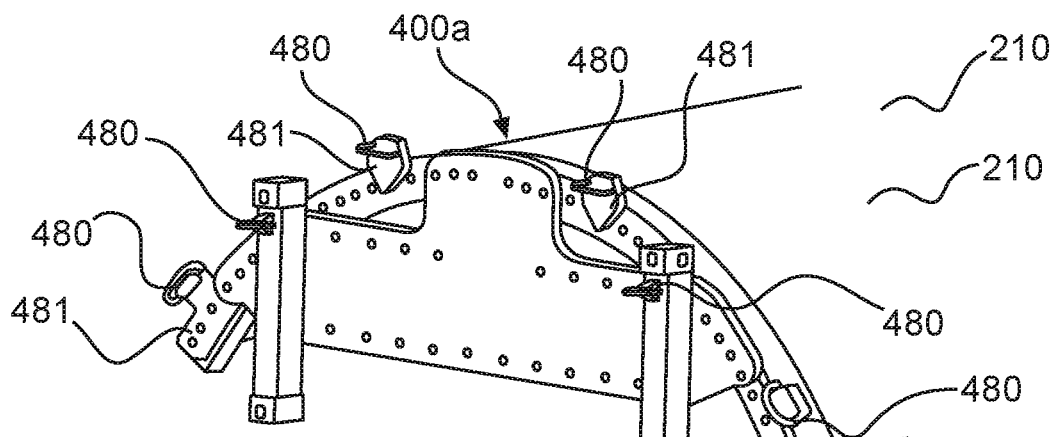
FIG. 15a shows a three-dimensional illustration of a further variant of a transportation module.
Figure 15B:
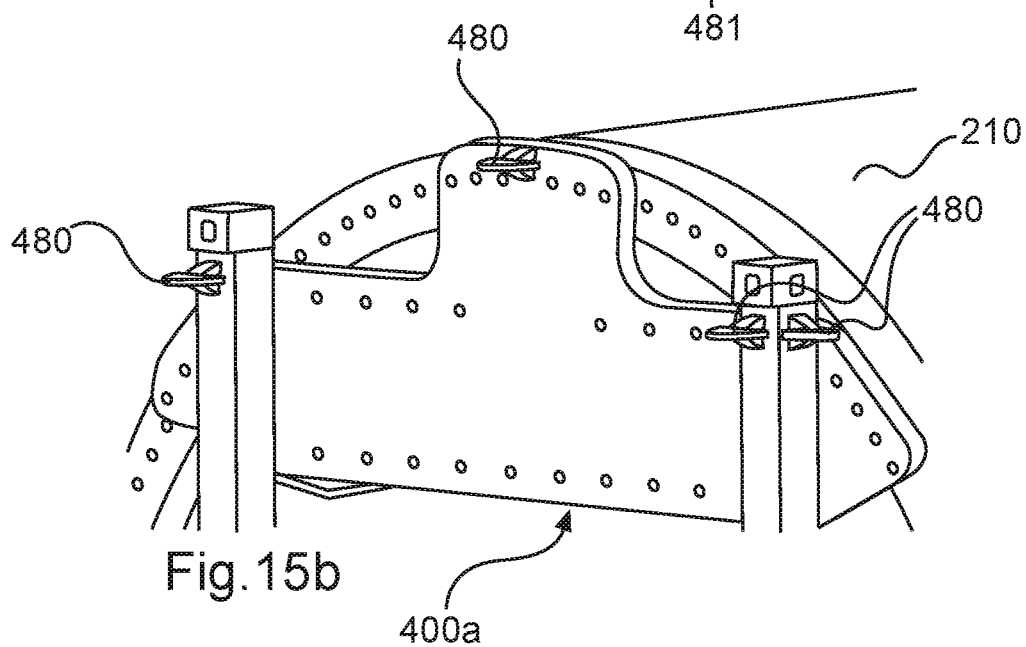
FIG. 15b shows a three-dimensional illustration of a further variant of a transportation module.

FIGS. 14a, b, c and 15a and b illustrate different variants of transportation modules 400a, these differing in particular by way of the arrangement of engagement elements 480. In FIG. 15*a* engagement elements 480 are arranged not just on the transportation module, but also on additional engagement-flange pieces 481.

Figure 15C:
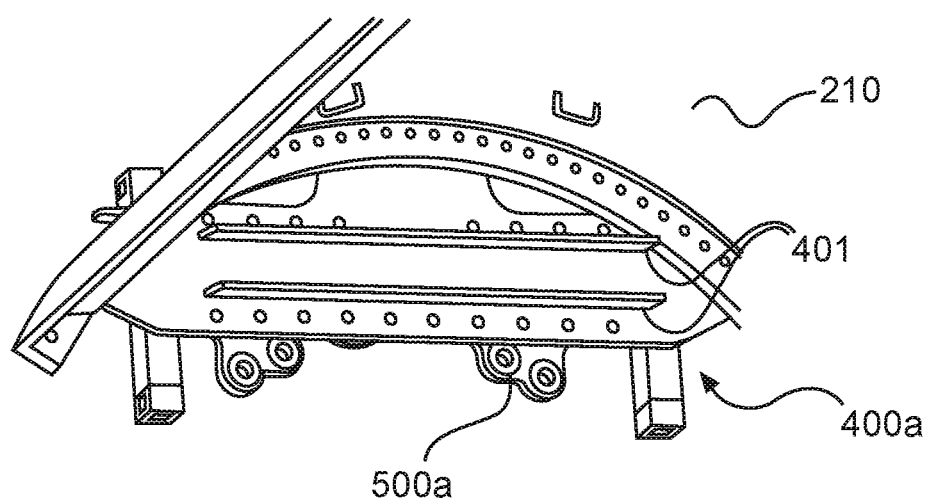
FIG. 15c shows a three-dimensional illustration of a further variant of a flange frame.

FIG. 15*c* shows a flange frame which has a transportation module 400*a* and a lifting module 500*a* and in which reinforcing ribs 401 are provided on the transportation module 400*a*.

Figure 16A:
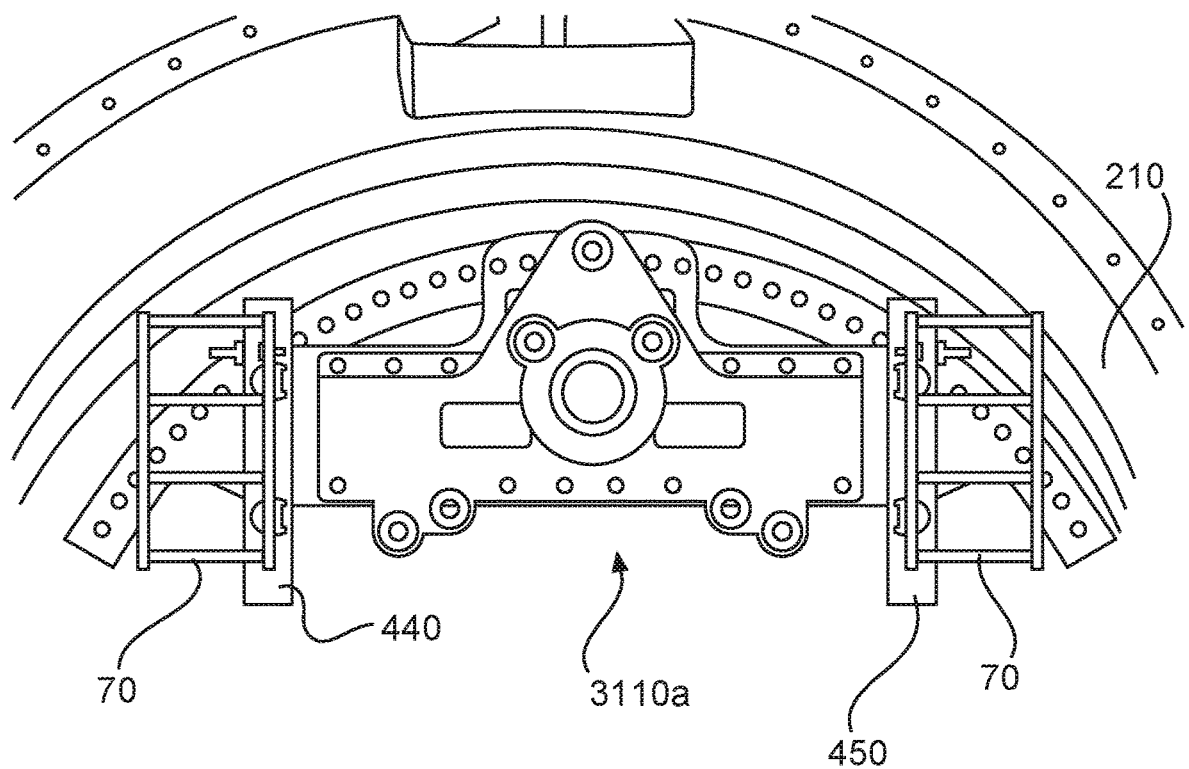
FIG. 16a shows a three-dimensional illustration of a variant of a flange frame with ladders.
Figure 16B:
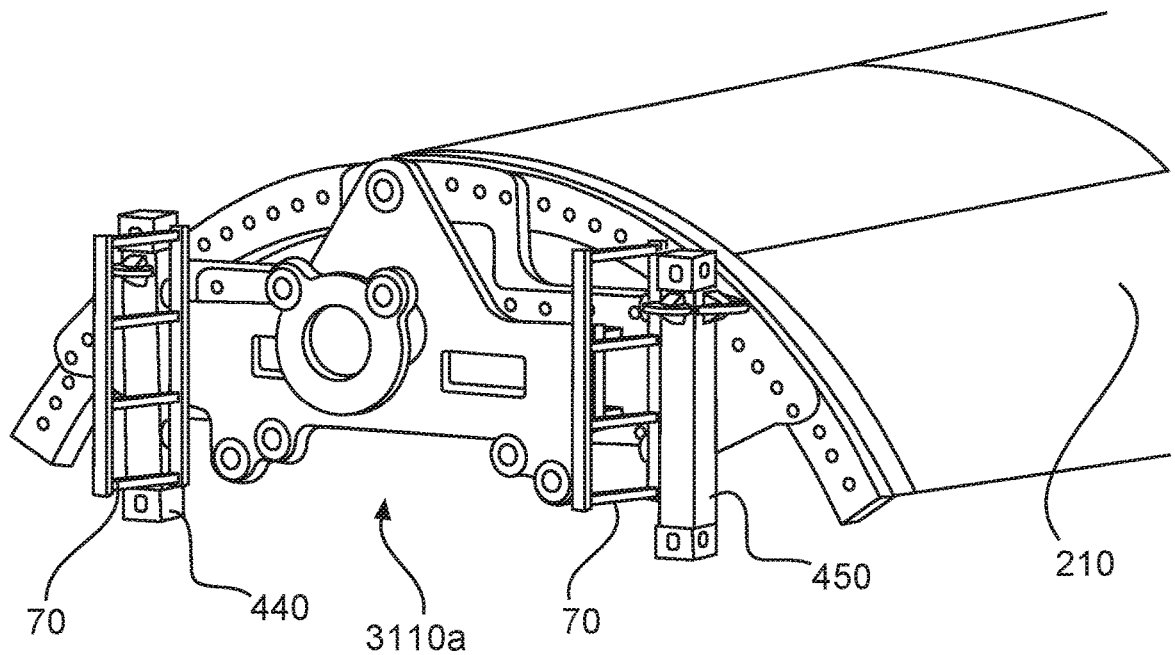
FIG. 16b shows a further three-dimensional illustration of a variant of a flange frame with ladders.

FIGS. 16*a* and *b* show further three-dimensional illustrations of variants of a flange frame 3110*a*, this time with ladders 70. In FIG. 16*a*, a respective ladder element 70 is arranged on the two supporting elements 440, 450, said ladder element extending essentially in a main-extent plane which is parallel to a main-extent plane of the flange frame. In FIG. 16*b*, a respective ladder element 70 is arranged on the two supporting elements 440, 450, and said ladder element extend in each case essentially in a main-extent plane which is orthogonal to a main-extent plane of the flange frame. Arranging ladder elements 70 on a flange frame 3110*a* has the advantage, in particular in the case of tower segments being stacked, that even an upper end of the stack can be reached via the ladders 70.

The invention claimed is:

1. A flange frame for transporting or assembling a tower segment for a wind turbine, a tower section of a wind turbine, or a tower of a wind turbine, comprising:
   at least two flange sections for fastening the flange frame in a releasable manner on a horizontal flange of a tower segment,
   a lifting module comprising a lifting bolt and engagement elements for engagement with a sling-like lifting unit, wherein the lifting bolt is arranged in a central region of the lifting module and the engagement elements are arranged on opposing sides of the lifting bolt, wherein the sling-like lifting unit is configured to be guided over an end of the lifting bolt and butt against part of an outer circumferential surface of the lifting bolt, wherein the lifting bolt is a protrusion that projects from a surface,
   a supporting element for supporting the flange frame on a standing surface, and
   a transportation module, wherein the transportation module and the lifting module are connected to one another in a releasable manner.

2. The flange frame as claimed in claim 1, wherein the transportation module comprises the at least two flange sections and the supporting element.

3. The flange frame as claimed in claim 2, wherein the at least two flange sections are spaced apart from one another in a circumferential direction of the horizontal flange.

4. The flange frame as claimed in claim 1, wherein the supporting element is configured to be stacked between first and second supporting elements of adjacent first and second flange frames such that a lower end of the supporting element, in a transportation state, is supported on an upper end of the first supporting element and an upper end of the supporting element, in the transportation state, supports a lower end of the second supporting element of the second flange frame.

5. The flange frame as claimed in claim 1, wherein the supporting element is designed to be fitted on the horizontal flange of a tower segment, wherein the supporting element does not extend beyond an outer surface of a tower-segment wall.

6. The flange frame as claimed in claim 1, wherein the supporting element is designed to be fitted on the horizontal flange of the tower segment, wherein the supporting element extends beyond a plane which connects two vertical flanges of the tower segment.

7. The flange frame as claimed in claim 1, wherein the supporting element is designed such that a lower end of the supporting element, in a transportation state, is supported on an upper end of a further supporting element, which is arranged on a horizontal flange of a further tower segment.

8. An assembly set for preassembling, transporting, and/or assembling a tower segment or a tower section of a wind turbine, comprising the flange frame as claimed in claim 1.

9. The assembly set as claimed in claim 8, comprising a first transportation module, and a second transportation module, wherein the first and second transportation modules are of different designs.

10. The assembly set as claimed in claim 8, comprising a plurality of identically designed lifting modules.

11. The assembly set as claimed in claim 9, wherein the first and second transportation modules have different dimensions.

12. The assembly set as claimed in claim 9, wherein flange sections of the first transportation module are designed for fastening on a horizontal flange of a first tower segment with a first radius and flange sections of the second transportation module are designed for fastening on a horizontal flange of a second tower segment with a second radius, wherein the first radius differs from the second radius.

13. The assembly set as claimed in claim 9, wherein the first transportation module has first connecting elements for releasable connection to the lifting module, and wherein the second transportation module has second connecting elements for releasable connection to the lifting module.

14. The assembly set as claimed in claim 13, wherein positions of the first and second connecting elements differ.

15. A method for preassembling, transporting, and/or assembling a tower segment or a tower section of a wind turbine, the method comprising:
   fastening the at least two flange sections of the flange frame as claimed in claim 1 on a horizontal flange of a tower segment,
   fitting the sling-like lifting unit on the lifting bolt by the sling-like lifting unit being guided over the end of the lifting bolt and butting against part of the outer circumferential surface of the lifting bolt, and
   raising the flange frame by the sling-like lifting unit.

16. A method for transporting a tower segment or a tower section of a wind turbine, the method comprising:
   fastening the at least two flange sections of a first flange frame as claimed in claim 1 on a horizontal flange of a first tower segment,
   fastening flange sections of a second flange frame on a horizontal flange of a second tower segment,
   fitting the sling-like lifting unit on the lifting bolt by guiding the sling-like lifting unit over the end of the lifting bolt and butting against part of the outer circumferential surface of the lifting bolt,
   raising the flange frame by the sling-like lifting unit, and
   arranging the first and second tower segments one above the other by lowering of the first tower segment such that a lower end of the supporting element of the first flange frame is supported on an upper end of the supporting element of the second flange frame.

17. A method for preassembling, assembling a tower segment or tower section for a wind turbine, the method comprising:

fastening the at least two flange sections of a first flange frame as claimed in claim 1 on a horizontal flange of a first tower segment, fastening at least two flange sections of a second flange frame on a horizontal flange of a second tower segment, arranging the first and second tower segments one beside the other such that a first vertical flange of the first tower segment and a first vertical flange of the second tower segment are located opposite one another, connecting the horizontal flanges of the first and second tower segments by a connecting-flange piece, and connecting the first and second flange frames by a strut.

18. The method as claimed in claim 17, comprising:

altering a distance between a second vertical flange of the first tower segment and a second vertical flange of the second tower segment in relation to one another by the strut.

19. The method as claimed in claim 17, comprising:

connecting the first vertical flange of the first tower segment to the first vertical flange of the second tower segment.

20. The method as claimed in claim 17, comprising:

fastening flange sections of a third flange frame on a horizontal flange of a third tower segment;

arranging the first, second, and third tower segments one beside the other such that a second vertical flange of the first tower segment and a first vertical flange of the third tower segment are located opposite one another and the first vertical flange of the second tower segment and a second vertical flange of the third tower segment are located opposite one another, connecting the horizontal flange of the third tower segment to the at least two flange sections of the first and second tower segments by two connecting-flange pieces, and connecting the third flange frame of the third tower segment to the two flange frames of the first and second tower segments by two struts.

21. The method as claimed in claim 20, comprising:

connecting the second vertical flange of the first tower segment to the first vertical flange of the third tower segment, and connecting the first vertical flange of the second tower segment to the second vertical flange of the third tower segment.

22. A wind turbine comprising:

a tower segment, and a tower section having been transported or assembled in accordance using the flange frame as claimed in claim 1.

* * * * *